United States Patent [19]

Strong et al.

[11] Patent Number: 5,498,438
[45] Date of Patent: Mar. 12, 1996

[54] NUT BASED SNACK PRODUCTS AND PROCESS OF MAKING

[75] Inventors: David R. Strong, Denville, N.J.; Kristberg Kristbergsson, Njardvik, Iceland

[73] Assignee: Nabisco, Inc., Parsippany, N.J.

[21] Appl. No.: 755,971

[22] Filed: Sep. 6, 1991

Related U.S. Application Data

[63] Continuation-in-part of Ser. No. 415,457, Sep. 29, 1989, abandoned.

[51] Int. Cl.⁶ .......................................................... A23L 1/36
[52] U.S. Cl. ........................ 426/632; 426/517; 426/518; 426/633; 426/637; 426/661; 426/662; 426/808
[58] Field of Search .................................... 426/632, 633, 426/808, 517, 518, 661, 662, 637

[56] References Cited

U.S. PATENT DOCUMENTS

| | | |
|---|---|---|
| 2,685,519 | 8/1954 | Moore . |
| 3,615,592 | 10/1971 | Peterson . |
| 4,113,889 | 9/1978 | Baxley . |
| 4,329,375 | 5/1982 | Holloway, Jr. et al. . |
| 4,466,923 | 8/1984 | Friedrich . |
| 4,466,987 | 8/1984 | Wilkins et al. . |

FOREIGN PATENT DOCUMENTS

| | | |
|---|---|---|
| 861445 | 1/1971 | Canada . |
| 866150 | 3/1971 | Canada . |
| 60-94060 | 5/1985 | Japan . |

OTHER PUBLICATIONS

McWatters, Kay H., Influence of Defatting and Toasting on Binding and Processing Characteristics of Peanut Flours Utilized in Snack–Type Peanut Chips, The Journal of Food Science, vol. 45, p. 831 (1980).

Harris et al., 1972, Development and Use of Defatted Peanut Flours, Meals, and Grits, Bull. 431.

Agri. Exp. Station, Auburn University, Auburn, Alabama, pp. 15 and 31.

*Primary Examiner*—Helen Pratt

[57] ABSTRACT

The invention presented is a high protein, low fat, nut-based snack product made from a dough base comprised of a defatted, roasted nut meal, a starch component and water. The individual product pieces have a nut content of at least about 40% based upon the total weight of the dough base. The particle size distribution in the meal is such that a major portion are relatively fine and a minor proportion relatively coarse.

20 Claims, No Drawings

NUT BASED SNACK PRODUCTS AND PROCESS OF MAKING

RELATED APPLICATION

This application is a continuation-in-part of U.S. patent application Ser. No. 07/415,457, filed Sep. 29, 1989, now abandoned the disclosure of which is incorporated by reference herein.

BACKGROUND OF THE INVENTION

This invention relates to nut based food products and to a process for preparing such food products. More particularly, the present invention relates to a snack made from nut meals and a process for preparing same.

Snack items have assumed a prominent role in the American diet, especially peanuts or other types of nuts which are consumed in large quantities and are nutritious due to their high protein content. It would be desirable to produce a nut-based snack product in either sheeted form or in the form of snack "sticks" having visually-apparent pieces of nuts and which retain the characteristic nut flavor found in roasted nuts such as peanuts, but which has a crunchy/chewy, pliable texture.

It would also be desirable to prepare a nut-based snack product which is high in protein and low in fat relative to other similar snack items such as corn chips or potato chips or sticks. Such a product has not yet appeared on the market. Attempts have been made in the prior art to prepare such a snack item but have failed for various reasons.

The art provides numerous attempts to produce snack products with a high nut content. For example, U.S. Pat. No. 2,685,519 to Moore discloses a peanut product in chip form which has been prepared from raw peanuts. According to this patent, raw nuts are ground to a coarse meal, to which is added water to form a dough. The dough is sheeted and cut into conveniently sized pieces which are baked or fried and then salted to produce the finished product. Moore teaches away from using too fine a meal with full fat peanuts since the finished product has an undesirable peanut butter flavor as compared with a roasted peanut flavor.

Furthermore, this patent describes the use of only raw, full-fat nuts which are formed into a dough without an intermediate step of roasting the nuts, thus resulting in incomplete development of the characteristic roasted flavor of the nuts since the only flavor development takes place in the final baking or frying step. Because the product is made with full fat peanuts, it has a high fat content which results in an undesirable level of calories. The high fat content also results in an unacceptable chewy texture more reminiscent of peanut butter.

Another attempt is described in Canadian Patent 861,445 to Brown et al., which discloses a chip-type food product prepared from ground full-fat nuts by forming a high moisture slurry containing crushed nuts having a maximum particle size of ⅛ inches and not more than 20% by weight fines (i.e., particles passing through a 60 mesh ASTM) with an edible binder. The slurry is then cast onto a conveyor belt and passed through a first drying oven at a temperature of 160° F. for a residence time of 20 minutes. The partially dried sheet is peeled from the belt and cut into chip-size pieces which are passed through a second drying oven at a temperature of 160° F. for 90 minutes to reduce the moisture to less than 2% by weight.

The Brown et al. patent does teach the desirability of using coarse pieces of nuts for their ability to enhance the flavor of the chip and the use of binding ingredients to hold the product together and help produce a crisp texture. Brown et al. also limits the amount of fines to less than 20% of the nuts used. However, the method used in this patent teaches away from frying, but rather, employs an extensive and complex multi-phased drying procedure. The thick slurry formed is not of a dough consistency and, therefore, cannot be worked and sheeted or effectively extruded. Furthermore, the product takes over two hours to cook with an intermediate stage in which the semi-dried sheet is shaped, thus making the process unnecessarily costly and cumbersome.

Japanese Kokai No. 60-94060, assigned to House Shokuhin Kogy, relates to a chip-type snack made with defatted and ground nuts in which powdered cereal and/or starch are mixed with seasonings and spices and crushed nuts to form a dough which is sheet and fried. The patent avoids the problems associated with binding coarse pieces of peanut by using only 3–10% ground nuts which are easily held together by a much greater amount of starch based cereal type products. Hence, the resulting chip contains only a minor proportion of peanuts.

Attempts have been made to study the effects that roasting and toasting have on production of chip-type snacks, but only peanut flours were examined and the products produced all had poor texture and flavor. See McWatters, et al., "Influence Of Defatting and Toasting On Binding And Processing Characteristics Of Peanut Flours Utilized In Snack-Type Peanut Chips", The Journal of Food Science, Vol. 45 at page 831 (1980).

Canadian Patent 866,150 to Stevenson et al. teaches the use of defatted peanuts in preparing a chip-type snack product. The nuts are roasted to achieve a flavor characteristic of roasted peanuts and then blanched before being treated to reduce the oil content to within the range of 20 to 30 percent. The resulting nuts are then ground to form a meal having a particle size within the range of 8 mesh to 200 mesh, U.S. equivalent screen. A dough is prepared by mixing the meal with water, an emulsifying agent and a binding agent. The dough is rolled into a thin sheet, cut into chips, and the chips are deep fried for a short period.

It has now been found that snacks derived from defatted and ground nuts having markedly improved texture, appearance, and flavor, can be prepared by the process described hereinbelow.

SUMMARY OF THE INVENTION

It is an object of the present invention to provide a nut-based snack product and a process for preparing it.

It is another object of the present invention to provide a nut-based snack product which is high in protein and low in fat.

It is a further object of the present invention to provide a nut-based snack product with a clean, perceptible, non-greasy nut flavor and a crunchy/chewy texture.

It is yet another object of the present invention to provide a nut-based snack product and a process for preparing it wherein the dough base is cohesive enough such that it may be easily worked and then sheeted or extruded with substantial reduction in tearing.

It is an additional object of the present invention to provide a nut-based snack product and a process for preparing it wherein the dough base is made with a sufficiently coarse grind of nut meal such that it permits frying of sheeted pieces without excessive oil absorption.

It is still another object of the present invention to provide a nut-based snack product and a process for preparing it wherein the dough base possesses sufficient binding capacity such that the dough may be easily worked and sheeted or extruded, and yet, upon frying, the individual pieces have good structural integrity and a clean, perceptible nut-like flavor which is not masked by the other ingredients. Moreover, the surface of the snack is visually attractive due to the presence of pieces of nut.

These and other objects which will become apparent from the description which follows, are achieved according to the present invention, which provides a high-protein, low-fat, nut-based snack product characterized by a clean, perceptible, non-greasy nut flavor and a crunchy, chewy texture. The product comprises individual pieces obtained by cooking a dough comprised of a defatted, roasted nut meal, a starch component and water. The product pieces have a nut content of at least 40% based upon the total weight of the dough base and, advantageously, an oil content of less than about 30% based upon the weight of the finished snack product. The individual pieces have visually apparent particles of nut and good structural integrity.

The nut meal employed to prepare the snack product of the invention is derived from full fat nuts which have been treated to reduce the oil content thereof to about 15% to about 30% by weight and thereafter have been roasted to achieve a roasted nut flavor, before being comminuted to produce the meal. The particle size distribution in the nut meal is such that a major proportion of the particles are relatively fine and a minor proportion are relatively coarse.

As will be discussed in detail hereinafter, the particle size of the nut meal is of importance, especially in low-fat oil roasted nut chips or sticks. It has now been found that, by combining a major portion of small particles with a minor proportion of larger particles, it is possible to achieve very satisfactory texture and flavor characteristics in the resulting products.

If the particle size is too small, e.g., the particles all pass through 30 USS mesh, the resulting chips or sticks absorb too much oil when fried and have an oily/greasy feel in the mouth. However, the small particles are needed to give a binding in the product and a crisp and crunchy texture.

If the particle size is slightly larger, e.g., all pass through 16 USS mesh, the peanut flavor is good but the texture of the product is hard. If the particle size is mostly large, e.g., all pass through 12 but are retained on 16 USS mesh, there is insufficient binding in the chip or stick. Control of particle size distribution is therefore especially important to providing an acceptable balance of calories, flavor, and texture.

The process of the invention, in its broadest aspect, comprises preparing a dough comprising defatted roasted nut meal having the above characteristics, a starch component, and sufficient water; forming the dough into sheet form, cutting the dough into individual pieces of a desired shape and size; and cooking the individual pieces to produce a snack product with good structural integrity, having visually apparent pieces of nut, and a non-greasy, crunchy/chewy nut-like texture and flavor.

In the alternative, the dough, when formed, is not formed into a sheet. Rather, the dough is extruded into a stick or rod shaped product. The product can then be cooked, to form a snack product with good structural integrity, having visually apparent pieces of nut, and a non-greasy, crunchy/chewy nut-like texture and flavor.

DETAILED DESCRIPTION OF THE INVENTION

The present invention provides a high protein, low-fat snack product which is characterized by a clean, perceptible, non-greasy nut flavor. The term "nuts" and "nut meals" as used in this description includes whole nuts and pieces of nuts such as peanuts, almonds, cashews, Brazil nuts, filberts, pecans, walnuts, and the like. For purposes of conciseness in description, the following disclosure will center around a snack made with low fat peanuts. It is not intended, however, to be limited to peanuts because the principles disclosed for peanuts apply to other nuts as well.

The product is prepared with a nut meal having particular characteristics discussed hereinafter and which has been blended with a starch component and sufficient water to form a dough which is capable of being both worked and sheeted or extruded. After cooking, the snack is characterized by a unique, crunch/chewy texture and good structural integrity. The nut content of the dough base is at least 40% based upon the total weight of the dough base and the product will preferably have an oil content after cooking of less than about 30%.

The cooked product is characterized by a continuous even surface with discrete, visually-apparent pieces of nut incorporated into that surface. The size of these visually apparent pieces of nut will vary depending upon how coarse a meal is used in making the product and the type of nuts used. There is a practical limit on the size of the pieces of nut which may be incorporated if an acceptable product is to be produced. It has been found that the size of the nut pieces advantageously is not greater than about 3/16 of an inch and preferably not greater than about 1/8 of an inch in diameter.

The snack is further characterized by a good structural integrity. By this is meant that the individual pieces, after they have been cooked, are strong enough such that they are able to withstand the shear type forces exerted on the pieces during the commercial handling and packaging of the product without excessive breakage taking place. Generally, it has been found that the use of coarse meals in this type of product is limited because of the resulting poor structural qualities and dough handling characteristics.

The prior art attempted to overcome this problem by using higher levels of binding agents. Although this allows the use of coarser meals, the binders used tended to mask or alter the roasted nut-like flavor that is being sought. This is one of the problems not solved by the prior art in that nut-based snacks hitherto produced have been found to be too fragile unless prepared with nut flours, which tend to absorb too much oil, resulting in poor flavor and texture as described in the article by McWatters et al., supra.

The high nut content and the presence of the visually apparent pieces of nut are important factors which contribute to the snack product of the invention a crunchy/chewy texture similar to that of roasted nuts. Crunchy/chewy is a subjective term which seeks to characterize the texture of the product. In sensory terminology it is a combination of various factors. The crunchiness is a combination of hardness, which may be defined as the force required to compress a sample of the product between the molar teeth, and fracturability, which is defined as the force required to crack a sample of the product. Chewiness is a related sensory term which describes the textural feel of the product experienced in the mastication process.

The terms crunchy and chewy are closely related to the structural integrity of the product and to a large degree describe the amount and type of mechanical force required to effectively masticate the food product disclosed. The latter force is clearly related to the force necessary to shear the product and shear strength is a property which can be measured by a variety of methods.

In testing the product for structural integrity and retention of textural quality on storage, the following random sampling procedure can be used. Samples of the cooked product are stored in a vacuum sealed container at room temperature for at least two weeks and not more than six weeks. The container is then unsealed and ten pieces of the product are removed at random for testing with each piece being subjected to the following shear test. Each chip or stick is placed horizontally across a ¾-inch gap between two knife edges of a sample support on an Instron Universal testing machine. A ¼-inch thick plastic plate about 2 inches wide and having a lead edge rounded to a diameter equal to the plate thickness, is vertically moved toward the midpoint of the knife edges at a crosshead speed of 50 millimeters (mm) per minute. The maximum slope of the force-distance trace on the Instron chart and the force required to break the sample are recorded.

The products made using the process disclosed herein will desirably exhibit maximum forces to breakage of the sample of from about 100 grams to about 500 grams, and a maximum value of slope of the force distance trace of from about 0.3 kilogram force per mm to about 1 kilogram force per mm of crosshead travel. While other textures may be achieved and will be satisfactory, products within the above ranges will have a desirable textural profile.

Another advantage of the invention herein described is that the nut-based snack item is not only flavorful, it is also an excellent source of protein. Typically, snack items of this type, such as potato or corn chips or potato sticks, are made from a farinaceous base which is a much lower source of protein. The snack products of the invention generally are found to have a protein content which can range up to at least about five times greater than that of a potato or corn chip or stick type item, thus providing a highly nutritious snack item.

The nut-based snack items disclosed herein are further characterized by a low fat content. Potato chip type products presently on the commercial market contain generally in excess of 38% oil by weight. Oil contributes substantially to the calorie content of such items, and, accordingly, it is desirable to provide a snack item with a reduced oil content and a resulting reduced calorie content. Also, by reducing the oil content of the snack product, the actual amount of oil required to make the product is reduced, providing a more economical product.

By "low-fat" as used herein is meant a finished snack product that has an oil content of less than about 35% and preferably less than about 30% by weight based upon the total weight of the finished snack product. An acceptable commercial product can be made with an oil content of from about 25% to about 30% based upon the total weight of the finished product.

The product is prepared with a defatted, roasted nut meal as described below, blended with a starch component and, preferably, an emulsifier component. The process generally entails combining the dry ingredients with sufficient moisture and working to form a dough base, and working that dough base for sufficient time such that it may be sheeted or extruded, and cut without extensive tearing. The individual pieces so formed may then be cooked to produce the crunchy/chewy, nut-based snack product of the invention.

The exact procedures used to de-fat and roast the nuts are numerous and well known in the art and any of these procedures can be employed in preparing the nut meal used in the products of the invention. However, the sequence in which the defatting and the roasting take place is a factor in the desired properties in the final end-product. Thus, it has been found that the desired properties are more readily achieved if the defatting precedes the roasting.

In extracting oil from the nuts, both pressing and solvent extraction may be used as well as any other acceptable method for defatting nuts. What is important is that the oil content be sufficiently reduced so that a low-fat product may be prepared. Typically, this will entail reducing the oil content of the nuts to about 15% to about 30% by weight and preferably to about 17% to about 25% by weight based upon the total weight of the defatted nuts.

Oil extraction can be performed by any method suitable for fat extraction, including extraction with a solvent, such as hexane extraction as well as extraction with a supercritical fluid like carbon dioxide. Indeed, it is believed that many of the art-accepted methods for removing the caffeine from coffee beans can be utilized to remove the fat from nuts.

Supercritical extraction, discussed by Friedrich in U.S. Pat. No. 4,466,923 and Snyder, Friedrich, and Christianson in "Effect of Moisture and Particle Size on the Extractability of Oils from Seeds with Supercritical $CO_2$", JAOCS Vol 61 No. 12 (December 1984), uses a fluid which is maintained in its gaseous state at a temperature above its so-called "critical temperature". In this way, the fluid will not become a liquid, regardless of the pressure applied when under pressure, the supercritical fluid, most often carbon dioxide, acts as a selective solvent for the oil of the nuts.

Another possible means for extracting the fat from nuts is by the use of bacteria which can digest the oil, or enzymes or other compositions secreted by such bacteria which can digest the oil. Although probably of limited commercial practicality, biodigestion of the oil can effectively extract the desired amount of oil from the nuts.

Most preferably, defatted nuts are prepared by mechanically pressing the raw nuts to extract at least some of their initial triglyceride fat content, such as taught by U.S. Pat. No. 4,329,375 to Holloway et al. and U.S. Pat. No. 4,466,987 to Wilkins et al., the disclosures of each of which are incorporated herein by reference. Such mechanical pressing can be carried out in a Carver press at pressures of about 250 to about 2500 pounds per square inch (psi), preferably about 1100 to about 1300 psi, for about 15 to about 120 minutes.

Although the exact times and pressures for oil extraction can be varied to obtain the desired degree and rate of extraction, pressures above this range will extract oil more rapidly but cause more physical damage to the nuts and possibly a reduction in the amount of retained natural flavors can occur. Although pressures below the disclosed range can be employed with somewhat less nut breakage, the time required for extraction of the desired amount of oil will increase. By utilizing the above-described pressing conditions, a desirable balance between calorie reduction and final product flavor and texture can be achieved. Preferably, the pressure is elevated to the desired level in a step-wise or staged manner.

Both dry roasting (including air and granular roasting) and oil roasting may be used in preparing the nuts so long as a clean, perceptible, roasted nut flavor is developed.

When oil roasting is desired, the nuts are subjected to roasting using procedures which may vary depending upon he particular type of raw nut which is being processed. Typically, the nuts are roasted in an edible oil, such as refined peanut oil, at a temperature in the range of about 285° F. to about 340° F., preferably from about 315° F. to about 325° F., and for a time which will vary depending upon the particular type of nut being processed and upon the temperature of roasting and the degree of roasting desired.

Illustratively, the time and extent of roasting will be greater in the case of peanuts (from about 4.0 to about 9 minutes) than in the case of cashews (from about 1.5 to about 4.5 minutes). The most appropriate roasting conditions to be adopted in any particular instance can be determined readily by a process of trial and error. The nuts will take up some of the roasting oil, up to about 5% by weight of the nuts, but such uptake will not significantly alter the low fat nature of the nuts.

In air roasting, the nuts are roasted in a stream of hot air at a temperature of about 275° F. to about 400° F., preferably about 320° F. to about 335° F. Roasting times and temperatures can be varied depending upon the particular type of nut being processed, as well as the roasting temperature and degree of roasting desired. Illustratively, the time and extent of roasting will be greater for peanuts (i.e., about 10 minutes to about 30 minutes) than for cashews (i.e., about 3 minutes to about 15 minutes).

In granular roasting, the nuts are contacted with a finely divided heat transfer media which is heated to a temperature of about 315° F. to about 465° F., preferably about 380° F. to about 410° F. Roasting times and temperatures will vary depending upon the particular type of nut being processed and the degree of roasting desired. Illustratively, the time and extent of roasting will be greater in the case of peanuts (i.e., about 1 minute to about 9 minutes) than in the case of cashews (i.e., about 30 seconds to about 3 minutes).

The finely divided heat transfer vehicle useful in the practice of this invention can be any suitable finely divided material which will absorb heat from a heat source, such as a flame, and transfer the heat to the nuts upon contact. Preferably, the finely divided heat transfer vehicle is salt, ceramic beads, sand, or metal balls, most preferably ceramic beads.

Any of the means known in the art may be used for grinding or comminuting the roasted nuts to an acceptable particle size. A preferred method is to use a cutting-type machine with rotating knives since the particles seem to have sharper edges and tend to bind better than other particle shapes.

Illustrative of the preparation of suitable nut meal is the following procedure. The peanuts which may be used are any of those commercially available which are used in food products, of which red-skinned Virginia extra large peanuts are typical. Raw peanuts which have been shelled are placed in a Carver press and pressed at 18,000 psi for about 1 hour. The pressure starts at a value of about 5000 psi and is gradually raised to the final pressure over the period of pressing. Pressing under these conditions reduces the original oil content from about 50% oil to about 15% to about 30% oil by weight, based upon the total weight of the defatted peanut.

The partially defatted nuts are blanched by means of a whole nut blancher. The nuts are then subjected to dry roasting in an oven at about 300° F. for about 20 minutes. The partially defatted roasted nuts so obtained are ground in a cutting type mill with rotating knives to produce a nut meal.

The distribution of particle size in the nut meal used is an important factor in achieving the desired properties in the nut product of the invention. If the particle size distribution is too fine on average, i.e., is a flour type nut meal, then the product tends to absorb an excessive amount of fat upon frying, resulting in a finished product with an undesirably greasy texture.

If the average particle size of the meal is too coarse, then the dough base produced will be susceptible to tearing upon working and sheeting or extruded. Furthermore, upon frying of the individual pieces, too coarse a grind will result in a product which does not possess enough structural integrity to withstand the handling it is subjected to, thus resulting in a great deal of breakage and a too fragile product.

It has now been found that by combining a particular range of weight ratios of coarse fraction and fine fraction of the nut meal, with sufficient other starches, one can obtain a dough product which can be worked and has strong enough binding capacities. It is believed that the portion of a fine grind nut meal in the dough contributes to the binding capacity and makes working of the dough possible with a high level of much coarser nut meal. The presence of the fine fraction does not result in excessive fat absorption.

A coarse nut meal fraction and the fine particle fraction may be separated by sieving the ground nut meal. The coarse fraction comprises those particles which will pass through a 10 mesh screen but not through a 20 mesh screen. A preferred coarse fraction comprises those particles which will pass through a 12 mesh screen but not through a 16 mesh screen. By fine nut meal fraction, we mean those ground up nut particles which will pass through a 16 mesh screen and preferably through a 30 mesh screen.

In preparing a nut meal for use in making the products of the present invention, the fractions may be combined in a range of weight ratios of from about 6:1 to about 2:1 of fine to coarse fractions respectively, depending upon the texture desired and the amount of binding capacity needed. A preferred product is made wherein the fine and coarse nut meals are combined in about a four to one ratio.

In preparing a product with a clean, perceptible, nut flavor, it is preferred that the amount of nut meal used in the dough base be at least 40% of the total weight of the dough base. An acceptable range in which the nut meal may be used is from about 40% to about 80% based upon the total weight of the dough base. A preferred range is from about 45% to about 65% based upon the weight of the dough base.

Any of a wide variety of starch materials may be used as the starch component employed in preparing the dough for production of the snack products of the invention. A consideration in choosing this component is that it should not mask the nut flavor imparted to the product by the nut meal. Furthermore, the binding capacity of the farinaceous material need also be considered since it, along with the finer particles in the nut meal, is responsible for holding this product together.

The farinaceous material used may be a root or root type ingredient such as tapioca, potato, or waxy maize. It may also be a cereal based ingredient such as corn, wheat, rice, or mixtures of these. Examples of acceptable starches are a potato starch, such as Bind-up B-55, Bind-up B-6, or a cornstarch such as Baka-Snack or mixtures of these.

The amount of farinaceous material used in making up the dough base will vary depending upon its individual binding capacity and the binding capacity of the other ingredients present. Advantageously, the amount of starch employed in the dough ranges from about 5% to about 15% by weight, and a preferred range will be between about 7% to about 12% by weight, based upon the total weight of the dough base.

An emulsifier component may be advantageously used in making up the dough base. It serves as a dough conditioner, making the dough easier to work and sheet or extrude. A wide variety of edible emulsifying agents known in the art can be employed. Illustrative of such emulsifiers are the glycerol monostearates. The amount of emulsifier used will vary from about 0.5% to about 5% by weight and preferably will be from about 1% to about 3% by weight based upon the total weight of the dough base. The most preferred level is about 1.5% by weight.

The moisture content of the dough base may vary widely but is limited in practice by the need that the dough be sufficiently workable and sheetable or extrudable. A preferred range will be from about 20% to about 40% by weight moisture and a most preferred range will be from about 25% to about 35% by weight moisture, based upon the total weight of the dough base.

The process of the present invention comprises preparing a dough by combining defatted, roasted nut meal, a starch component, and sufficient water to form a dough, sheeting or extruding the dough and the cutting it into individual pieces. The pieces are then cooked and, optionally, seasoned, to produce a high protein, low fat, nut-based snack product with a clean, perceptible, non-greasy nut flavor which has at least an about 40% nut content.

In order to prepare a snack chip according to this invention, the dough must be sheetable. A sheetable nut-based dough is any dough which contains sufficient moisture and elasticity such that it may be worked, sheeted, and cut on standard manufacturing equipment without being overly sticky or prone to excessive tearing during the sheeting process.

In preparing a sheetable dough, all that is necessary is to blend together, using the proportions of ingredients discussed above, the defatted roasted nut meal, which meets the requirements as to mode of preparation and particle size distribution discussed above, the starch component and water in such a manner that a homogenous, cohesive dough is formed.

The ingredients making up the dough base may be blended in any manner desirable which will produce a sheetable dough. Typically, the nut meal is combined with the starch component and other optional ingredients such as an emulsifier and salt. This dry blend is mixed and water is slowly added until an acceptable dough consistency is observed.

Working of this dough is continued for a period of time sufficient to impart the elastic qualities needed if the dough is to be sheeted without excessive tearing. Mixing time will preferably be at least about 5 minutes to not more than about 30 minutes. Overworking of the dough is to be avoided since it may result in a loss of elasticity as well as lengthening the manufacturing process.

The next step in the process is the sheeting of the dough base. This may be accomplished manually or using any commercial manufacturing equipment which would be used to sheet similar snack type products. Consideration should be given to the fact that this dough base may be more susceptible to tearing due to the incorporation of such a large proportion of coarse pieces of nut. It will be appreciated that there is a practical limit to the thickness of the dough sheet prepared if a chip type snack is the desired end product. Preferably, the thickness of the sheet will be between about 1/16 and about 1/4 of an inch.

After sheeting, the dough sheet is cut into individual pieces. These pieces may be of any desired shape such as geometric shapes like circles, triangles, ovals, squares, and so forth. The size of the individual pieces can also vary greatly but they will typically have a surface area of from about 1/2 square inch up to about three square inches.

The manufacturing steps of mixing, working, sheeting, and cutting will typically take place under ambient temperature which, in manufacturing settings, may run from about 40° F. to about 110° F. Obviously, lower and higher temperatures may be employed if desired.

In order to prepare a snack stick according to this invention, the dough must be extrudable. An extrudable nut-based dough is any dough which contains sufficient moisture and elasticity such that it may be worked, extruded, and cut on standard manufacturing equipment. In preparing an extrudable dough, the dough is formed using the procedures detailed above for forming a sheetable dough.

When the dough is prepared, it is extruded using convention procedures and equipment well known in the art. By extrusion is meant that the dough is forced through a die under conditions including elevated pressure and, possibly, an elevated temperature. Typically, extrusion involves passing the dough through a suitable apparatus (referred to as an extruder) in which elevated pressure and, when desired, temperature are generated. By doing so, the ingredients are expelled through a die, i.e., a constricted opening, or a plurality of dies under these high pressure conditions.

The dough in the extruder is forced through the die(s) into an area where the pressure is significantly less, i.e., approximately ambient, than in the extruder. Preferably, the pressure at the die(s) can vary between about 200 psi to about 2300 psi, preferably about 1000 psi to about 1300 psi. When elevated temperatures are used, they can vary between about 220° F. and about 300° F. These temperatures and pressures can be varied by the skilled artisan to produce a product having a desired texture, shape, and/or size. For instance, the greater the pressure difference between the extruder and the area into which the product enters after being forced through the die(s), the larger the product. Care must be taken, though, to avoid creating an overly brittle or crumbly product.

The extruding apparatus will advantageously have associated therewith a cutting mechanism such as a knife or series of knives which cuts the product into small pieces as it exits through the die(s). This cutting apparatus, in combination with the shape of the die(s) through which the product is forced, determines the shape of the snack food of the present invention. Advantageously, the die is round or oblong in order to form the desired snack stick.

A round die can have a diameter which can be as high as about 3/8 of an inch and is preferably between about 1/16 of an inch and about 5/16 of an inch. When oblong, the die can have a length in the major dimension of up to about 3/8 of an inch and is preferably between about 1/16 of an inch and about 5/16 of an inch; and a minor dimension of up to about 3/16 of an inch and is preferably between about 4/16 of an inch and about 5/32 of an inch.

A suitable apparatus for extrusion of the dough is a Wenger X-25S extruder, commercially available from Wenger company of Sabetha, Kans. Other suitable extruders are available from Adams Company of Miami, Fla., and it will be recognized that any suitable extruder which is able to subject the dough to elevated pressure, and then force the blend through at least one die, can be used in the process of the present invention.

Such extruders can comprise an initial chamber or portion which will function to prepare the dough by hydrating the blend of nut meal and starch component to the desired degree. Such a chamber can mix the dry blend by suitable blades or mixing bars while applying moisture (as well as other optional ingredients as discussed above) to the desired level.

Upon emerging from the extrusion die, the extruded material is cut into sticks on rods which can vary in length as desired. Typically, the sticks will vary between about ¾ of an inch and about 2½ inches. More preferably, the sticks will be about 1½ inches in length.

The dough pieces so produced are then cooked. Cooking may be achieved using conventional procedures and equipment well known in the art. Typically the snack will either be baked or fried. Frying is the preferred method for cooking this snack. After the pieces have been cut they may then be conveyed to a fryer or, if desired, to some type of storage unit where they may be held until a fryer becomes available.

The frying to which the pieces may be subjected may vary widely to fit various tastes. All that is required is that the pieces be subjected to a frying oil at a high enough temperature such that the desired browning and flavor development takes place. A preferred frying procedure involves immersing the dough pieces into a fryer unit for 10 seconds to about one minute dwell time, where the oil is between 300° F. to 400° F. Typically, the oil is at a temperature of about 375°±5° F. and the pieces have a residence time in the oil of approximately 20 to approximately 40 seconds resulting in an acceptable, fried snack.

Any commercially acceptable edible oil or fat may be used in the frying step. This includes all edible, fatty acid triglycerides regardless of origin or whether they are solid or liquid at room temperatures. Typically, vegetable oils are used for frying and they are usually selected from the group consisting of soybean oil, corn oil, coconut oil, cottonseed oil, peanut oil, safflower oil, palm heart oil, sunflower oil, palm oil, and rapeseed oil, and mixtures of the above.

Fats or oils which have been subjected to some level of hydrogenation may be used. The preferred frying fats for use in this invention are soybean, cottonseed, and peanut oils, or mixtures of these which provide a suitable product under the frying conditions used. One illustrative example is a partially hydrogenated mixture of 75 parts soybean and 25 parts cottonseed oil which possesses a clean, bland taste with no off flavors, a Wiley melting point of 95° F.±2° F., a solid fat index of: at 50° F. (about 30–40% solids), at 70° F. (about 15–25%), at 80° F. (about 10–25%), at 92° F. (about 5% maximum solids), an iodine value of not more than about 79, and a smoking point greater than 25° F.

As an alternative to oil roasting, the chips or sticks can be baked or dry roasted like nuts. This is suitably achieved by passing the chips or sticks continuously through a forced air oven on a wire mesh conveyor. The temperature will typically be in the range of from about 300° F. to about 350° F. and the roasting time can be from about 20 to about 30 minutes.

Optionally, the fried product may then be conveyed to an enrobing apparatus where seasoning and flavors may be added to the surface of the product. The flavor-enrobed, fried snack produced is further characterized by a moisture content of less than about 5% and preferably between about 3% and about 5%. Desirably, individual chips or sticks will have a density within the range of about 0.1 to about 0.4 grams per cubic centimeter (gm/cc) and preferably between about 0.2 and about 0.35 gm/cc.

A highly desirable fried product after flavor enrobing will have a stack density (grams per centimeter of stack height) within the range of from about 3 to about 7 grams per cm of stack height, and preferably from about 4 to about 6 grams per cm. Stack densities can be calculated by loosely stacking a plurality of 4 cm diameter chips, noting the stack height, weighing the stack and dividing the weight by the height.

The following examples are presented for the purpose of further illustrating and explaining the present invention and describing the best mode known to the inventors, but are not to be taken as limiting in any regard. Unless otherwise indicated, all parts and percentages are by weight.

EXAMPLE 1

Oil roasted peanut chips

This example illustrates the production of a snack product made from roasted, partially-defatted peanuts according to the present invention.

Raw redskin Virginia extra large peanuts which have been shelled are placed in a Carver press and pressed at 18,000 psi for about 24 minutes. The pressure starts at a value of about 1000 psi and is gradually raised to the final pressure over the period of pressing. Pressing under these conditions reduces the original oil content from about 48% oil to about 20% oil. The partially defatted nuts are then blanched by means of a whole nut blancher. The blanched nuts are subjected to dry roasting in an oven at 325° F. for about 20 minutes.

The partially defatted roasted nuts are then ground in a cutting type mill with rotating knives to produce a nut meal. The nut meal so produced is sieved to separate a coarse fraction comprising particles which pass through a 12 mesh screen but not through a 16 mesh screen, and a fine fraction comprising those particles which pass through a 16 mesh screen. Portions of both fractions are then recombined using a weight ratio of fine to coarse particles of 4:1.

The recombined nut meal fractions are combined with potato starch and emulsifier and mixed in a Hobart type mixer. To this dry blend is slowly added water until an acceptable dough is formed. Mixing time is about 5 minutes. The emulsifier used is "Myvaplex 600" (a trademark of the Eastman Chemical Products Inc., Kingsport, Tenn.) which is concentrated glycerol monostearate. The composition of the dough formed is as follows:

| | |
|---|---|
| Coarse fraction of peanut meal (through 12 mesh but not through 16 mesh) | 16.60 g |
| Fine fraction of peanut meal (through 16 mesh) | 66.69 g |
| Potato starch (Bindup 6) | 13.50 g |
| Emulsifier (Myvaplex 600) | 2.25 g |
| Water | 51.00 g |

The dough formed is passed through a dough sheeter with smooth stainless steel roller to give sheets 3/16 of an inch in thickness. The sheets are cut into oval pieces with a long diameter of about 1¾ inches and a short diameter of about 1¼ inches. The oval shaped pieces are deep fat fried in peanut oil for 30 seconds at 375° F. Upon removal from the deep fat fryer, about 1.5% by weight salt is sprinkled on the peanut chips.

The peanut chips formed are characterized by a golden to dark golden brown color with small peanut chunks being visible. The chips have a superior peanut flavor impact with a crisp/crunchy, yet tender mouthfeel. The finished product has a fat content of 36.95%, a moisture content of 1.68%, and a protein content of 32.08%. The resulting peanut chip has a maximum force reading of 456 grams when measured by an Instron Universal testing machine as set forth above. The maximum slope of the force-distance trace is 0.78 kg/mm.

EXAMPLE 2

Dry roasted peanut chips

This example describes the preparation of another peanut chip according to the present invention. The details of the procedure are the same as in Example 1, the only differences being that salt (1.8% by weight) was sprinkled on the cut chip prior to roasting and the peanut chips are dry roasted at 325° F. for seven minutes. The dough has the following composition:

| | |
|---|---|
| Coarse Peanut Meal (i.e., through a 12 mesh, but not a 16 mesh) | 16.65 g |
| Fine Peanut Meal (i.e., through 16 mesh) | 66.69 g |
| Corn Starch (Baka-Snack) | 13.5 g |
| Emulsifier (Myvaplex 600) | 2.25 g |
| Water | 51.00 g |

The peanut chips formed are characterized by a golden to dark golden brown color with small peanut chunks being visible. The chips have a superior peanut flavor impact with a crisp/crunchy, yet tender mouthfeel. The finished product has a fat content of 15.43%, a moisture content of 1.70%, and a protein content of 42.20%. The resulting peanut chip has a test reading of 436 grams and a maximum slope of the force-distance trace of 0.87 kg/mm, when measured by an instron Universal testing machine.

EXAMPLE 3

Dry roast, honey-roasted peanut chips

The process of Example 2 is repeated except that the uncooked peanut chips are sprinkled on both sides with a 50:50 mixture of dried honey solids (Sweet n'Neat 2000) and Baker's sugar. The chips are then dry roasted at 325° F. for about 4.5 minutes. The peanut chips so obtained are possessed of the same excellent properties as those obtained in accordance with Example 1 but having a flavor enhanced by the honey-sugar treatment.

EXAMPLE 4

Dry roasted pecan chips

This sample illustrates the production of a snack product made from roasted, partially defatted pecans according to the present invention.

Raw jumbo pecans which have been shelled are placed in a Carver press and pressed at 18,000 psi for about 24 minutes. The pressure starts at a value of about 1000 psi and is gradually raised to the final pressure over the period of pressing. Pressing under these conditions reduces the original oil content from about 66% oil to about 46.06% oil. The partially defatted pecans are subjected to dry roasting in an oven at 325° F. for about 20 minutes.

The partially defatted roasted pecans are then ground in a cutting type mill with rotating knives to produce a nut meal. The nut meal so produced is sieved to separate a course fraction comprising particles which pass through a 12 mesh screen but not through a 16 mesh screen and a fine fraction comprising those particles which pass through a 30 mesh screen Portions of both fractions are then recombined using a weight ratio of coarse to fine particles of 1:4.

The recombined nut meal fractions are then combined with potato starch and emulsifier. To this dry blend is slowly added water until an acceptable dough is formed. The mixing time is about 5 minutes. The composition of the dough is as follows:

| | |
|---|---|
| Coarse pecan meal (i.e., through a 12 mesh but not through a 16 mesh) | 16.60 g |
| Fine pecan meal (i.e., through a 30 mesh) | 66.69 g |
| Potato Starch (Bindup 6) | 13.50 g |
| Emulsifier (Myvaplex 600) | 2.25 g |
| Water | 51.00 g |

The dough so prepared is then sheeted and cut into pieces using the procedure and conditions described in Example 1 and the cut pieces are dry roasted at 325° F. for 15 minutes. The pecan chips formed are characterized by a light cocoa brown to a dark cocoa brown color with small lighter brown pecan chunks being visible. The chips have a superior pecan flavor impact with a crisp/crunchy, yet tender mouthfeel. The finished product has a fat content of 38.75%, a moisture content of 1.73% and a protein content of 17.87%. The maximum Instron force to fracture is 162 grams and the maximum slope of the force-distance trace is 0.33 kg/mm.

EXAMPLE 5

Oil roasted pecan chips

This example illustrates the production of another snack product made from roasted partially defatted pecans according to the present invention.

The procedure described in Example 4 is repeated exactly as described save that the cut pieces of dough are cooked by oil roasting at 375° F. to 25 seconds. Part of the same batch of raw jumbo pecans as used in Example 4 is used as starting material.

The pecan chips formed are characterized by a light cocoa brown to a dark cocoa brown color with small lighter brown pecan chunks being visible.

The chips have a superior pecan flavor impact with a crisp/crunchy, yet tender mouthfeel. The finished product has a fat content of 56.43%, a moisture content of 1.85% and a protein content of 13.09%. The resulting pecan chip has a maximum force to fracture reading of 211 grams and a maximum slope of the force-distance trace of 0.26 kg/mm, when measured by an Instron Universal testing machine.

EXAMPLE 6

Oil roasted almond chips

This example illustrates the production of a snack product made from roasted partially defatted almonds according to the present invention.

Raw unblanched 23/25 count nonpareil almonds which have been shelled are placed in Carver press and pressed at 18,000 psi for about 24 minutes. The pressure starts at a value of about 1000 psi and is gradually raised to the final pressure over the period of pressing. Pressing under these conditions reduces the original oil content from about 51% oil to about 30.42% oil. The partially defatted almonds are then subjected to dry roasting in an oven at 325° F. for about 20 minutes.

The partially defatted roasted almonds are then ground in a cutting type mill with rotating knives to produce a nut meal. The nut meal so produced is sieved to separate a coarse fraction comprising particles which pass through a 12 mesh screen but not through a 16 mesh screen and a fine fraction comprising those particles which pass through a 30 mesh screen.

Portions of the two fractions are then recombined in a weight ratio of coarse to fine particles of 1:4. The recombined nut meal fractions are then combined with potato starch and emulsifier. To this dry blend is slowly added water until an acceptable dough is formed. The mixing time is about 5 minutes. The composition of the dough is as follows:

| | |
|---|---|
| Coarse almond meal (i.e., through a 12 mesh but not through a 16 mesh) | 16.69 g |
| Fine almond meal (i.e., through a 30 mesh) | 66.69 g |
| Potato Starch (Bindup 6) | 13.50 g |
| Emulsifier (Myvaplex 600) | 2.25 g |
| Water | 51.00 g |

The dough so prepared is then sheeted and cut into pieces using the procedure and conditions described in Example 1 and the cut pieces are oil roasted at 375° F. for 25 seconds.

The oil roasted almond chips are characterized by a dark brown color with small dark cocoa brown colored chunks being visible. The chips have a superior almond flavor impact with a crisp/crunchy, yet tender mouthfeel. The finished product has a fat content of 51.06%, a moisture content of 2.0% and a protein content of 23.03%. The resulting almond chip requires a maximum force to fracture of 210 grams and a maximum slope of the force-distance trace of 0.27 kg/mm, when measured by an Instron Universal testing machine.

EXAMPLE 7

Dry roasted almond chips

This Example describes the preparation of another chip made from almonds in accordance with the invention. The procedure of Example 6 is repeated except that the dough pieces are salted prior to roasting and then dry roasted at 325° F. for 20 minutes and corn starch is included in the dough forming components. Part of the same batch of almonds used as starting material in Example 6 are used in this Example. The composition of the dough is as follows:

| | |
|---|---|
| Coarse almond meal (i.e., through a 12 mesh but not through a 16 mesh) | 16.25 g |
| Fine almond meal (i.e., through a 30 mesh) | 66.69 g |
| Corn starch (Baka-Snack) | 13.50 g |
| Emulsifier (Myvaplex 600) | 2.25 g |
| Water | 51.00 g |

The almond chips formed are characterized by a golden brown color with small almond cocoa brown chunks being visible. They have an almond flavor impact with a crisp/crunchy, yet tender mouthfeel which is slightly more crunchy. The finished product has a fat content of 26.26%, a moisture content of 1.90% and a protein content of 35.05%. The resulting almond chip has a maximum force to fracture reading of 318 grams and a maximum slope of the force-distance trace of 0.52 kg/mm, when measured by an Instron Universal testing machine.

EXAMPLE 8

Dry roasted peanut sticks

This Example illustrates the production of a snack product made from roasted, partially defatted peanuts according to the present invention.

Raw redskin Virginia extra large peanuts which have been shelled and blanched, are placed in a Carver press and pressed at 18,000 psi for about 24 minutes. The pressure starts at a value of about 1000 psi and is gradually raised to the final pressure over the period of pressing. Pressing under these conditions reduces the original oil content from about 48% oil to about 20% oil. The blanched, defatted nuts are subjected to dry roasting in an oven at 325° F. for about 20 minutes.

The partially defatted roasted nuts are then ground in a cutting type mill with rotating knives to produce a nut meal. The nut meal so produced is sieved into separate coarse, fine and very fine fractions, as described below. The nut meal fractions are combined with potato starch and emulsifier and mixed in a Hobart type mixer. To this dry blend is slowly added water until an acceptable dough is formed. The following dough formulations are made:

| | Formulations | | |
|---|---|---|---|
| | A | B | C |
| Coarse fraction of peanut meal (through 12 mesh but not through 16 mesh) | 16.60 g | 0 | 0 |
| Fine fraction of peanut meal (through 16 mesh) | 66.69 g | 83.29 g | 0 |
| Very fine fraction of peanut meal (through 30 mesh) | 0 | 0 | 83.29 g |
| Potato starch | 13.50 g | 13.50 g | 13.50 g |
| Emulsifier | 2.25 g | 2.25 g | 2.25 g |
| Water | 51.00 g | 51.00 g | 51.00 g |

Each dough is extruded through a ⅛ of an inch×¼ of an inch oblong shaped die using a single piston hydraulic laboratory extruder. The extruded material is cut into 1½ inch long pieces and deep fat fried in peanut oil for 30 seconds at 375° F. Upon removal from the deep fat fryer, about 1.5% salt is sprinkled on the peanut sticks.

It is observed that the Formulation B sticks are oilier/greasier then the Formulation A sticks, and the Formulation C sticks are oilier/greasier than the Formulation B sticks. The Formulation A sticks are also found to exhibit better crispiness, fracturability, and tenderness than the sticks of either Formulation B or Formulation C.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A high protein, low fat, nut-based snack product, said product comprising individual pieces derived by cooking corresponding pieces of dough comprised of a defatted, roasted nut meal, a starch component and water, said cooked individual pieces having a nut content of at least about 40 percent by weight based on total weight of the dough base, said nut-meal being derived from roasted partially defatted nuts which have been comminuted into particles, the particles separated into a relatively coarse fraction which passes through a 12 US mesh screen but not through a 16 US mesh screen and a relatively fine fraction which passes through a 16 US mesh screen, and combined in a weight ratio of relatively fine to relatively coarse particles in the range of about 6:1 to about 2:1.

2. A nut-based snack product according to claim 1, wherein the defatted, roasted nut meal is made from peanuts.

3. A nut-based snack product according to claim 2, wherein the defatted, roasted nut meal has an oil content from about 15% to about 30% by weight.

4. A nut-based snack product according to claim 1, wherein the defatted, roasted nut meal is present in an amount in the range of from about 40% to about 80% by weight based upon the total weight of the dough base.

5. A nut-based snack product according to claim 1, wherein said starch component is a farinaceous material derived from the group consisting of potato, tapioca, waxy maize, corn, wheat and rice, and mixtures of these.

6. A nut-based snack product according to claim 1, wherein the snack product additionally contains an emulsifier component which is present in an amount in the range of from about 0.5% to about 5% by weight based upon the total weight of the dough base.

7. A nut-based snack product according to claim 6, wherein said emulsifier component comprises a concentrated glycerol monostearate.

8. A nut-based snack product according to claim 1, wherein the dough base comprises from about 45% to about 65% by weight of defatted, roasted nut meal; from about 5% to about 15% by weight of a starch component; from about 0.5% to about 5% by weight of an emulsifier component; and from about 20% to about 40% by weight water based upon the total weight of the dough base.

9. A peanut-based snack product according to claim 1, wherein the snack product has an oil content of from about 20% to about 30% by weight and a moisture content of less than about 5% by weight based upon the weight of the snack product after it has been cooked and seasoned.

10. A process for preparing a nut-based snack product which comprises
   a) preparing a dough comprising nut meal, a starch component, and sufficient water;
   b) forming said dough into individual pieces of a predetermined size and shape;
   c) cooking said pieces,
wherein said nut meal is derived from partially defatted, roasted nuts which have been comminuted into particles, separated into a relatively coarse fraction and a relatively fine fraction, and combined in a weight ratio of relatively fine to relatively coarse particles in the range of about 6:1 to about 2:1.

11. A process in accordance with claim 10, wherein said relatively coarse particles will pass through a 12 US mesh screen but not through a 16 US mesh screen and said relatively fine particles will pass through a 16 US mesh screen.

12. A process according to claim 10, wherein the defatted, roasted nut meal is made from peanuts.

13. A process according to claim 10, wherein the starch component is a farinaceous material derived from the group consisting of potato, tapioca, waxy maize, corn, wheat, and rice, and mixtures of these.

14. A process according to claim 10, wherein the dough additionally contains an emulsifier component which is present in the range of from about 0.5% to about 5% by weight based upon the total weight of the dough base.

15. A process according to claim 14, wherein the emulsifier component comprises a concentrated glycerol monostearate.

16. A process according to claim 10, wherein the dough base comprises from about 45% to about 65% by weight defatted, roasted nut meal; from about 5% to about 15% by weight of a starch component; from about 0.5% to about 5% by weight of an emulsifier component; and from about 20% to about 40% by weight water based upon the total weight of the dough base.

17. A process according to claim 10, wherein the dough is worked for from about 5 minutes to not more than about 30 minutes.

18. A process according to claim 10, wherein the individual pieces are cooked by deep fat frying.

19. A process according to claim 10, wherein defatted nuts used to form the nut meal are dry roasted to achieve a roast nut flavor.

20. A process according to claim 10, wherein the percentage by weight of nut meal in said dough is at least about 40 percent.

* * * * *